United States Patent

Bludssus et al.

Patent Number: 5,874,056
Date of Patent: Feb. 23, 1999

[54] METAL TUNGSTATES AND METHOD OF PREPARING THEM AND THEIR USE

[75] Inventors: Walter Bludssus, Bad Harzburg; Karlheinz Reichert, Hornburg; Udo Sulkowski, Vienenburg, all of Germany

[73] Assignee: H.C Starck GmbH & Co. KG, Goslar, Germany

[21] Appl. No.: 437,301

[22] Filed: May 9, 1995

[30] Foreign Application Priority Data

Jun. 3, 1994 [DE] Germany .......................... 44 19 575.3

[51] Int. Cl.$^6$ ...................................................... C01G 4/00
[52] U.S. Cl. .............................. 423/61; 423/593; 423/594
[58] Field of Search ................................ 423/61, 593, 594

[56] References Cited

U.S. PATENT DOCUMENTS 5,079,199  1/1992  Ochi et al. ............................... 501/136

FOREIGN PATENT DOCUMENTS 4419575  10/1995  Germany .
464084   4/1937   United Kingdom .................... 423/593

OTHER PUBLICATIONS

Chem. Abstract 88:177618, 1997 (no month), by Nakahara, et al., "Surface Properties of Spherical Calcium Tungstate Powder", Osaka Kogyo Gijutsu Shikensko Kiho, 28(3), pp. 201–206.

DIN 66131 publication of H.C. Starck, Jul. 1993.

German Patent Office action dated Dec. 5, 1994.

*Primary Examiner*—Steven Bos
*Attorney, Agent, or Firm*—Jerry Cohen

[57] ABSTRACT

Phase-pure, crystalline tungstates of general composition $Me(II)WO_4$, where $Me(II)$=Co, Ni, Zn, Pb, Mg, Ca, Sr and/or Ba. These are prepared by wet mixing tungsten components (preferably ammonium paratungstate or metatungstate) with corresponding sponding $Me(II)$ oxides and used, preferably, in making perovskites and X-ray intensifier phosphors.

5 Claims, No Drawings

METAL TUNGSTATES AND METHOD OF PREPARING THEM AND THEIR USE

BACKGROUND OF THE INVENTION

The present invention relates to pure-phase, crystalline tungstates of general composition Me(II)WO$_4$, where Me(II) =Co, Ni, Zn, Pb, Mg, Ca, Sr and/or Ba, to a method of preparing them and to their use.

Among their other applications, metal tungstates are employed as starting materials for the preparation of complex perovskites (e.g. Pb$_2$MeWO$_6$), which are used as materials for electrical ceramics and which are also used as a base material for X-ray intensifier phosphors. Methods are known for the synthesis of metal tungstates, particularly the mixing of metal oxides and subsequent solid state reaction at at least 750° C. In this "mixed oxide" method, which is described in U.S. Pat. No. 5,079,199 for example, the oxides have to be homogenized for a long period of time.

This processing step is generally carried out by wet milling in ball mills over a long period of time. In the course of this operation, the oxide mixture naturally becomes contaminated with extraneous elements. When ceramic grinding media are used these contaminants mainly consist of the elements Zr, Al and Si. However, since the optimum homogenization is not obtained in this process step, the dried mixture has to be calcined for several hours at temperatures above 750° C.

The principal object of the present invention is to provide metal tungstates which are not subject to the prior art disadvantages described above.

A further object of the invention is to prepare enhanced perovskites. A further object of the invention is to prepare enhanced X-ray intensifier phosphors.

SUMMARY OF THE INVENTION

Products have now been found which achieve this object. These products comprise pure-phase, crystalline metal tungstates of general composition Me(II)WO$_4$, where Me(II)= Co, Ni, Zn, Pb, Mg, Ca, Sr and/or Ba, which have a particle size distribution, as determined by the centrifuging method of 90% <5 $\mu$m, 50% <1 $\mu$m and 10% <0.3 $\mu$m. This invention relates to these metal tungstates. The determination by the centrifuging method is carried out after the powder has been dispersed for 5 minutes in water in an ultrasonic bath with the addition of 0.01% calgon.

The metal tungstates according to the invention preferably have a specific surface, as determined by the single-point BET N$_2$ method (DIN 66131), of 2.5 to 30 m$^2$/g.

The phase purity of the products, determined by the X-ray diffraction analysis method (XRD), is preferably greater than 97%.

Metal tungstates according to the invention are prepared by wet mixing the corresponding metal oxides and tungsten components, followed by drying and calcination, wherein the tungsten components are used in the form of ammonium paratungstate or ammonium metatungstate.

When ammonium paratungstate is used, homogeneous mixtures of materials can be produced very easily by means of a mixer, without a grinding process. Metal carbonates, metal hydroxide carbonates, metal hydroxides or metal oxides can be admixed with the ammonium paratungstate. Wet mixing is particularly advantageously carried out for a duration of 5 to 90 minutes. The homogenized mixtures of materials are advantageously dried or calcined from 100° C. up to a maximum of 1200° C., preferably at 400° C. to 1000° C., for 15 minutes to 4 hours.

Surprisingly, if basic metal oxides and/or hydroxides are mixed and reacted with ammonium paratungstate, these components even react with each other during the wet mixing stage. Depending on the basicity of the metal components, the NH$_4^+$ cation of the ammonium paratungstate is substituted by the metal cation, e.g. Mg$^{2+}$ or Ca$^{2+}$, Ba$^{2+}$ and Sr$^{2+}$, at different rates, so that when strongly basic metal components are used a thermally assisted reaction is no longer necessary and only a drying stage is necessary as a subsequent stage in order to remove the adhering water. A thermal treatment (heating of the mixture by external heat application) can even be dispensed with in such cases, unless it is desired to accelerate the drying process.

The thermal treatment is not necessary for the reaction of the oxide/hydroxide with the tungsten component.

X-ray diffraction analyses of dried mixtures of components confirm that reaction to form a metal tungstate has already occurred.

The method according to the invention provides the following advantages in particular:

- it enables the inexpensive starting material ammonium tungstate (para- or metatungstate) to be used,
- contamination with extraneous elements during mixing is avoided, and
- a shortening of the production time is obtained, with the formation of particularly fumne-grained, highly reactive final products.

The fine-grained final products, which have a particle size distribution measured by the centrifuging method of 90% <5 $\mu$m, 50% <1 $\mu$m and 10% <0.3 $\mu$m, are most suitable as highly reactive starting materials for the synthesis of complex perovskites.

This invention thus also relates to the use of the metal tungstates according to the invention as starting materials for the preparation of lead perovskites of general formula Pb$_2$Me(II)WO$_6$. They may also be used as X-ray intensifier phosphors, however.

DETAILED DESCRIPTION OF REFERRED EMBODIMENTS

The invention is explained below by way of examples, without being restricted thereto.

EXAMPLE 1

2.5 kg of ammonium paratungstate (APT, W content 70.6%) were added at room temperature (about 30° C.) to 0.41 kg of magnesium oxide (57% Mg). After adding 3 liters of water at room temperature the two components were homogenized for 30 minutes at 2000 rpm in a Thyssen-Henschel mixer. During this mixing operation the temperature of this mixture of substances increased to 45°–55° C. and the ammonium content of the APT decreased by about half. After drying at 100° C. the mixture of substances only contained 1.8% NH$_3$, compared with 4.5% in the starting mixture. The dried material already exhibited the first X-ray reflections of magnesium tungstate. After calcination at temperatures above 500° C for 2 hours, a pure-phase magnesium tungstate was obtained.

RESULTS

| | |
|---|---|
| Calcination temperature | 1000° C. |
| Bulk density | 14.5 g/inch$^3$ |

| | | |
|---|---|---|
| Tap density | 2.0 g/cm³ | |
| BET specific surface | 3.1 m²/g | |
| Particle size distribution | 90% < 1 µm | |
| | 50% < 0.45 µm | |
| | 10% < 0.2 µm | |

The specific surface of a tungstate calcined at 500° C. for 2 hours was 27 m²/g, and was 5.83 m²/g for a product calcined at 800° C. for 2 hours.

EXAMPLE 2

1.2 kg of ammonium metatungstate (W content: 67.95%) were added to 189.2 g of magnesium oxide (57% Mg). After adding about 1000 ml of water at room temperature the two components were homogenized for 30 minutes at 2000 rpm in a Thyssen-Henschel mixer. During this mixing operation the temperature of this mixture of substances increased to 45°–55° C. After drying at 100° C. the mixture was calcined at 1000° C. for 2 hours. A pure-phase magnesium tungstate was obtained.

Results

| Calcination temperature | 800° C. | 500° C. |
|---|---|---|
| BET specific surface | 2.9 m²/g | 16.5 m²/g |

In contrast to the tungstate from Example 1, the dried material from Example 2 was shown by X-ray diffraction to be completely amorphous. The two products, i.e. the products from Examples 1 and 2, were only comparable as regards phase purity at a temperature above 500° C.

EXAMPLE 3

1.720 kg of ammonium paratungstate (W content: 70.6%) were added at room temperature to 0.500 kg of calcium hydroxide (Ca(OH)$_2$ content: 97.8%). After adding about 1000 ml of water at room temperature the two components were homogenized for 30 minutes at 2000 rpm in a Thyssen-Henschel mixer. During this mixing operation the temperature of this mixture of substances increased to 45°–55° C. The ammonium content of the APT decreased significantly even during mixing, and was no longer present after drying. X-ray diffraction analysis showed that the mixture of substances had already reacted completely, without calcination, to form pure-phase calcium tungstate.

Results

| Calcination temperature | 100° C. (drying) | 500° C. |
|---|---|---|
| BET specific surface | 26 m²/g | 17.25 m²/g |
| Particle size distribution | 90% < 3 µm | |
| | 50% < 0.82 µm | |
| | 10% < 0.3 µm | |

We claim:

1. A method of producing metal tungstates, Me(II)WO$_4$, comprising mixing and reacting a tungstate selected from the group consisting of ammonium paratungstate and ammonium metatungstate with an Me(II) oxide and water, to form a reaction mixture wherein Me(II) is selected from the group consisting of Co, Ni, Zn, Pb, Mg, Ca, Sr and Ba, for a period of time sufficient to produce Me(II)WO$_4$.

2. The method of claim 1 and comprising the further step of heating the reaction mixture at 100° C. to 1,200° C. for 15 minutes to 4 hours.

3. The method of claim 1 wherein the tungstate is ammonium paratungstate whereby the metal tungstate is produced in a phase pure crystalline form.

4. The method of claim 1 wherein the tungstate is ammonium metatungstate and the Me(II)WO$_4$ product is calcined at a temperature of at least 500° C.

5. A method according to any one of claims 1–4 wherein the mixing and reacting is carried out for a duration of 5 to 90 minutes.

* * * * *